Oct. 20, 1953     J. E. DIEHL ET AL     2,656,475
ELECTRICAL MACHINE BRUSH AND METHOD OF PROLONGING ITS LIFE
Filed Dec. 19, 1952

INVENTORS
JOHN E. DIEHL & PAUL SMISKO
BY
Brown, Critchlow, Flick & Peckham
THEIR ATTORNEYS Patented Oct. 20, 1953

2,656,475

UNITED STATES PATENT OFFICE 2,656,475

ELECTRICAL MACHINE BRUSH AND METHOD OF PROLONGING ITS LIFE

John E. Diehl and Paul Smisko, St. Marys, Pa., assignors to Stackpole Carbon Company, St. Marys, Pa., a corporation of Pennsylvania Application December 19, 1952, Serial No. 326,812

7 Claims. (Cl. 310—228)

This invention relates to brushes for electrical machines, and to a method of increasing the life of carbon brushes in such machines and improving the performance of such brushes.

The performance and durability of electric brushes in motors, generators and the like leaves much to be desired, especially when brushes are used under certain critical atmospheric conditions which may occur, not only at very high altitudes, but at earth surface as well. When such critical conditions exist, the earth surface operated brushes may wear up to a thousand times as fast as they would under normal conditions, while the life of brushes at high altitudes may be only a matter of minutes. It is believed that the reason for such rapid brush wear is the inability of the brush to maintain a proper film on the contact surface of the rotating current collecting member. However, the details of the film required for maximum brush performance are not known; otherwise it would be a relatively simple matter to overcome the difficulty. Many theories concerning rapid wear have been advanced and many materials have been added to brushes in attempts to increase their life and improve their performance. Although some adjuvants have beneficial effects, it still is not known why, nor what characteristics successful adjuvants should have. More effective adjuvants are continually being sought.

It is among the objects of this invention to improve the performance and to prolong the life of electrical machine brushes, whether used at sea level or high altitudes.

This is done, in accordance with this invention, by holding polyfluoroethylene resin against the rotating current-collecting member, such as the commutator or slip ring, of the electrical machine. The resin may be in the form of a dummy brush, which carries no current, between the usual carbon brushes. Or, the resin may be combined with a carbon brush, as an insert or outside layer having one end forming part of the contact surface of the brush, or as an impregnant or finely divided particles mixed with the carbon particles of the brush. "Carbon" is used herein to cover all forms of carbon, such as graphite.

The invention is illustrated in the accompanying drawings, in which

Figure 1:
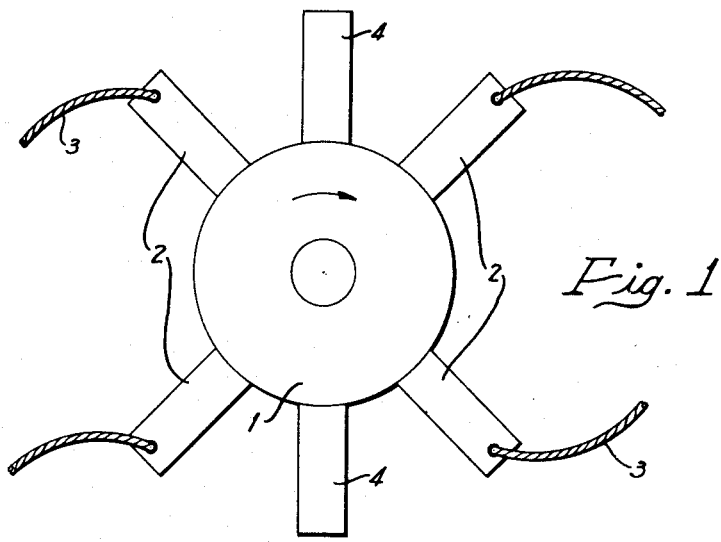
Fig. 1 is a schematic view showing a number of electric and dummy brushes engaging the rotating current-collecting member of an electrical machine.

Referring to Fig. 1 of the drawings, the rotating ring-like element 1 represents the commutator or slip ring of an electrical machine of any desired type. This current-collecting member will be referred to herein as a ring. Engaging the periphery of this ring is a plurality of brushes having concave contact surfaces, against which the ring slides as it rotates. The brushes are pressed against the ring in the usual manner by springs (not shown). Most of the brushes are current-carrying or electric brushes 2, as indicated by the shunt wires or pig tails 3 connected to their outer ends. These brushes are the usual carbon brushes. The remaining brushes 4, two in the case illustrated, are dummy brushes because they do not carry any electric current. Each of them is located between a different pair of the electric brushes.

In accordance with this invention the dummy brushes are formed from polyfluoroethylene resin; polytetrafluoroethylene and polychlorotrifluoroethylene resin being two outstanding examples. The use of such material in engagement with the rotating ring has been found, quite unexpectedly, to prolong the life of the adjacent carbon brushes at sea level as well as at high altitudes beyond anything known heretofore. The resin also materially improves the general performance of the brushes, and the commutation in particular. The reason for all this is not known, beyond the belief that an apparently highly beneficial film is formed and maintained on the surface of the ring as it rotates in engagement with the dummy brushes.

Figure 2:
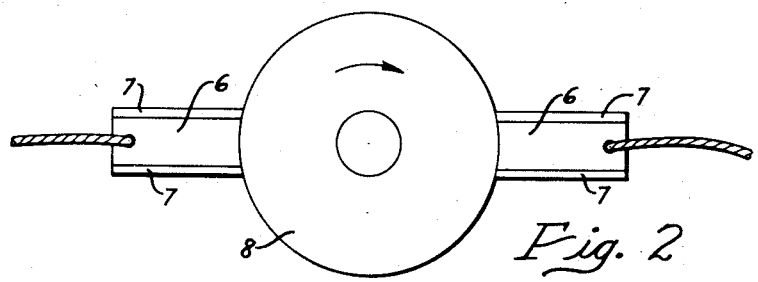
Fig. 2 is a similar view showing only electric brushes of modified form engaging the current-collecting member.

Instead of using dummy brushes, the polyfluoroethylene resin may be carried by the carbon bodies of the electric brushes themselves. One way in which the resin can be carried by a carbon brush is shown in Fig. 2. The carbon body 6 of each brush has a layer 7 of the resin covering either its front or back side or both of those sides. One end of each layer engages the adjoining rotating current-carrying ring 8 and forms part of the contact surface of the brush, across which it extends.

Figure 3:
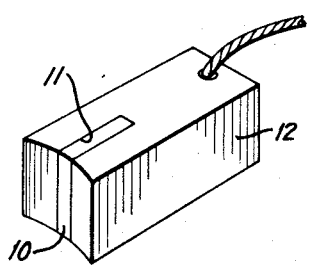
Fig. 3 is a perspective view of still another form of electric brush.

In the modification shown in Fig. 3 the polyfluoroethylene resin is in the form of a slug 10 that is inserted in a slot 11 extending across the contact surface of an electric brush having a carbon body 12. The slot extends inward a suitable distance toward the opposite end of the brush.

Figure 4:
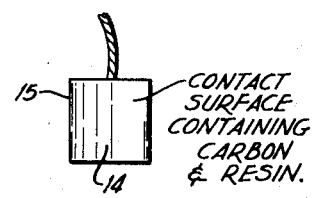
Fig. 4 is a view of the contact surface of a brush, illustrating a further modification.

On the other hand, the resin used herein need not be in solid form inserted in a slot in or applied to the outside of a carbon brush body, but can be mixed with the carbon of the brush throughout its body. This can be done by incorporating finely divided polyfluoroethylene resin in the carbon mix before it is molded into shape and baked to form an electric brush. Or the resin may be obtained in a form which can be used as an impregnant for the carbon brush body. In either case, as disclosed in Fig. 4 of the drawings, a mixture of carbon and resin forms the contact surface 14 of the brush 15, and the performance of the brush is improved a surprising amount.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A brush having a contact surface adapted to engage a rotating current-collecting ring, the brush having polyfluoroethylene resin at said surface.

2. A brush having a contact surface adapted to engage a rotating current-collecting ring, the brush having resin at said surface selected from the group consisting of polytetrafluoroethylene resin and polychlorotrifluoroethylene resin.

3. A brush having a contact surface adapted to engage a rotating current-collecting ring, the brush comprising a carbon body, and resin carried by said body, both carbon and said resin forming said surface, said resin being selected from the group consisting of polytetrafluoroethylene resin and polychlorotrifluoroethylene resin.

4. A brush having a contact surface adapted to engage a rotating current-collecting ring, the brush comprising a carbon body, and resin in said body, both carbon and said resin forming said surface, said resin being selected from the group consisting of polytetrafluoroethylene resin and polychlorotrifluoroethylene resin.

5. A brush having a contact surface adapted to engage a rotating current-collecting ring, the brush comprising a carbon body, and a layer of resin covering a side of said body, one end of said layer extending across said surface and forming a part of it, said resin being selected from the group consisting of polytetrafluoroethylene resin and polychlorotrifluoroethylene resin.

6. A brush having a contact surface adapted to engage a rotating current-collecting ring, the brush comprising a carbon body, said body being provided with a slot extending across said surface and inward therefrom, and resin inserted in the slot and forming a part of said surface, said resin being selected from the group consisting of polytetrafluoroethylene resin and polychlorotrifluoroethylene resin.

7. The combination with a rotating current-collecting ring, of carbon brushes engaging the ring, and at least one dummy brush engaging the ring between the carbon brushes, said dummy brush being formed from resin selected from the group consisting of polytetrafluoroethylene resin and polychlorotrifluoroethylene resin.

JOHN E. DIEHL.
PAUL SMISKO.

No references cited.